United States Patent
Hamada

(10) Patent No.: US 8,831,460 B2
(45) Date of Patent: Sep. 9, 2014

(54) IMAGE FORMING APPARATUS AND CONTROL METHOD THEREOF

(75) Inventor: Ryoh Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 154 days.

(21) Appl. No.: 13/490,651

(22) Filed: Jun. 7, 2012

(65) Prior Publication Data

US 2013/0013946 A1 Jan. 10, 2013

(30) Foreign Application Priority Data

Jul. 5, 2011 (JP) ................................ 2011-149173

(51) Int. Cl.
*G03G 15/00* (2006.01)
*G06F 9/46* (2006.01)
*H04N 1/00* (2006.01)

(52) U.S. Cl.
CPC ....... *H04N 1/00891* (2013.01); *H04N 1/00928* (2013.01); *Y02B 60/1267* (2013.01); *H04N 2201/0094* (2013.01)
USPC ................... 399/90; 399/37; 399/75; 399/88; 713/323; 718/102

(58) Field of Classification Search
USPC .......... 718/102; 713/323; 358/1.1, 1.13, 1.14, 358/1.15; 399/37, 75, 76, 77, 79, 88, 90
See application file for complete search history.

(56) References Cited

U.S. PATENT DOCUMENTS

| | | | | |
|---|---|---|---|---|
| 5,793,124 A | * | 8/1998 | Mitzaki | 307/66 |
| 7,154,619 B1 | * | 12/2006 | Yoshida et al. | 358/1.14 |
| 8,599,426 B2 | * | 12/2013 | Takahashi | 358/1.16 |
| 2004/0233472 A1 | * | 11/2004 | Gassho et al. | 358/1.15 |
| 2005/0047279 A1 | | 3/2005 | Ito | |
| 2005/0271407 A1 | | 12/2005 | Fujimori | |
| 2006/0077418 A1 | * | 4/2006 | Nakajima et al. | 358/1.14 |
| 2011/0058211 A1 | * | 3/2011 | Noecker et al. | 358/1.15 |
| 2012/0050812 A1 | * | 3/2012 | Takahashi | 358/1.16 |

FOREIGN PATENT DOCUMENTS

| | | | |
|---|---|---|---|
| JP | 2000-276322 A | | 10/2000 |
| JP | 2002-055569 A | | 2/2002 |
| JP | 2003-250026 A | | 9/2003 |
| JP | 2005-071269 A | | 3/2005 |
| JP | 2005-345894 A | | 12/2005 |
| JP | 2008155486 A | * | 7/2008 |
| JP | 2011-024125 A | | 2/2011 |

* cited by examiner

*Primary Examiner* — David Gray
*Assistant Examiner* — Francis Gray
(74) *Attorney, Agent, or Firm* — Renner, Otto, Boisselle & Sklar, LLP

(57) ABSTRACT

An image forming apparatus executes the steps of: calculating an end time of the job of which execution is instructed, and determining if the end time of the job is before the start time of power outage; specifying, if it is determined that the end time of the job is not before the start time of power outage, a part of processing of the job that can be completed before the start time of power outage; starting the job, if it is determined that the end time of the job is before the start time of power outage; and starting the part of processing of the job if it is determined that the end time of the job is not before the start time of power outage. Thus, abnormal termination of an active job due to power outage can be prevented.

5 Claims, 5 Drawing Sheets

FIG.4

| DAY OF THE WEEK / TIME SLOT | SUN | MON | TUE | WED | THU | FRI | SAT |
|---|---|---|---|---|---|---|---|
| 00 | 0 | 0 | 0 | 0 | 0 | 0 | 0 |
| 01 | 0 | 0 | 0 | 0 | 0 | 0 | 0 |
| 02 | 0 | 0 | 0 | 0 | 0 | 0 | 0 |
| 03 | 0 | 0 | 0 | 0 | 0 | 0 | 0 |
| 04 | 0 | 0 | 0 | 0 | 0 | 0 | 0 |
| 05 | 0 | 0 | 0 | 0 | 0 | 0 | 0 |
| 06 | 0 | 0 | 0 | 0 | 0 | 0 | 0 |
| 07 | 0 | 1 | 0 | 0 | 0 | 0 | 0 |
| 08 | 0 | 6 | 5 | 1 | 15 | 1 | 1 |
| 09 | 0 | 24 | 73 | 43 | 53 | 57 | 1 |
| 10 | 0 | 26 | 23 | 32 | 39 | 60 | 1 |
| 11 | 0 | 46 | 68 | 23 | 47 | 46 | 3 |
| 12 | 0 | 46 | 21 | 9 | 4 | 31 | 1 |
| 13 | 0 | 34 | 31 | 19 | 66 | 48 | 2 |
| 14 | 0 | 39 | 27 | 69 | 27 | 42 | 3 |
| 15 | 0 | 40 | 17 | 73 | 42 | 42 | 2 |
| 16 | 0 | 51 | 37 | 38 | 16 | 23 | 0 |
| 17 | 0 | 20 | 32 | 4 | 19 | 48 | 0 |
| 18 | 0 | 3 | 42 | 9 | 9 | 14 | 0 |
| 19 | 0 | 5 | 15 | 21 | 18 | 6 | 0 |
| 20 | 0 | 3 | 21 | 10 | 9 | 4 | 0 |
| 21 | 0 | 4 | 9 | 7 | 2 | 1 | 0 |
| 22 | 0 | 0 | 2 | 0 | 1 | 0 | 0 |
| 23 | 0 | 0 | 0 | 0 | 0 | 0 | 0 |

FIG.5

| TIME SLOT \ DAY OF THE WEEK | SUN | MON | TUE | WED | THU | FRI | SAT |
|---|---|---|---|---|---|---|---|
| 00 | | | | | | | |
| 01 | | | | | | | |
| 02 | | | | | | | |
| 03 | | | | | | | |
| 04 | | | | | | | |
| 05 | | | | | | | |
| 06 | | | | | | | |
| 07 | | | | | | | |
| 08 | | | | | | ▨ | |
| 09 | | ▨ | ▨▨ | ▨ | ▨▨ | ▨ | |
| 10 | | ▨ | ▨▨ | ▨ | ▨ | ▨▨ | |
| 11 | | ▨ | ▨▨ | ▨ | ▨ | ▨ | |
| 12 | | ▨ | ▨ | ▨ | | ▨ | |
| 13 | | ▨ | ▨ | ▨ | ▨▨ | ▨ | |
| 14 | | ▨ | ▨▨ | ▨ | ▨ | ▨ | |
| 15 | | ▨ | ▨ | ▨▨ | ▨ | ▨ | |
| 16 | | ▨▨ | ▨ | ▨ | ▨ | ▨ | |
| 17 | | ▨ | ▨ | ▨ | ▨ | ▨ | |
| 18 | | | ▨ | ▨ | | ▨ | |
| 19 | | | ▨ | ▨ | | | |
| 20 | | | ▨ | | | | |
| 21 | | | | | | | |
| 22 | | | | | | | |
| 23 | | | | | | | |

# IMAGE FORMING APPARATUS AND CONTROL METHOD THEREOF

CROSS-REFERENCE TO RELATED APPLICATION

This nonprovisional application claims priority under 35 U.S.C. §119(a) on Patent Application No. 2011-149173 filed in Japan on Jul. 5, 2011, the entire contents of which are hereby incorporated by reference.

BACKGROUND OF THE INVENTION

1. Field of the Invention

The present invention relates to an image forming apparatus capable of preventing abnormal termination of an active job because of a power outage, and to a method of controlling the apparatus.

2. Description of the Background Art

As one type of image processing apparatuses as electronic equipment, an image forming apparatus (typically a copy machine) for forming an image on a sheet of recording paper has been introduced to many places of business (companies and offices). In such a place of business, it is a common practice to have an image forming apparatus having a printer function or copy function connected to a network and to share the apparatus by a plurality of users. An MFP (MultiFunction Peripheral) as one type of such image forming apparatuses has a plurality of basic operational modes including a copy mode, a facsimile mode (hereinafter facsimile will be also denoted as FAX), a network compatible printer mode and a scanner mode.

Generally, a copy machine consumes much electric power at the time of activation from power on and at the time of executing the copy function. In an image forming apparatus having an image forming unit utilizing electro-photography process, a toner image recorded and reproduced on a photoreceptor is transferred to a sheet of recording paper. A heating and fixing unit includes a heat source such as a heater, and it fixes the toner that has been transferred to the sheet of recording paper on the sheet of recording paper by prescribed heat and pressure. Therefore, in order to provide an environment enabling speedy image formation, it becomes necessary to keep constant the temperature of the heating and fixing unit. For this purpose, power conduction to the heat source such as the heater must always be controlled. By way of example, temperature of the roller in the fixing unit is kept at a certain temperature even in a waiting period (so-called ready state), so as to make shorter the time before copying is executed.

Such control naturally increases power consumption. It is quite wasteful to keep the fixing unit warm as described above at a time of day when frequency of use of the copy machine is low. Since the heater requires much electric power, this poses a significant problem from the viewpoint of energy saving. Recently, reduction of power consumption at the places of business comes to be an important issue, and constant consumption of much electric power as described above is undesirable.

Japanese Patent Laying-Open No. 2005-345894 (hereinafter referred to as '894 Reference) discloses a technique of reducing wasteful power consumption by stopping power conduction to the fixing unit if no operation is made for a prescribed time period after the end of copying.

As a method of saving power if date and time when the copy machine is not used is known in advance, Japanese Patent Laying-Open No. 2005-71269 (hereinafter referred to as '269 Reference) discloses a method of setting an image processing system to a power saving mode on holidays. Japanese Patent Laying-Open No. 2002-55569 (hereinafter referred to as '569 Reference) discloses a technique of saving power by switching an image forming apparatus to the energy saving mode at a peak season when general people consumes much power.

The techniques disclosed in '894, '269 and '569 References, however, cannot always cope with a power outage on short notice due to external factor, independent from the schedules set in the apparatuses. More specifically, it is not always possible to change the schedule before a power outage in consideration of expected time when the power outage starts (hereinafter referred to as outage start time). In such a situation, it may become impossible because of the power outage to normally end or temporarily suspend a print job that is being executed, which is inconvenient. Abnormal termination caused by a power outage may require some troubleshooting work when the image forming apparatus is restarted after the end of outage. By way of example, if paper jam has occurred, work to eliminate the jam would be necessary. Some types of troubles may be difficult to fix.

SUMMARY OF THE INVENTION

Therefore, in view of the problems described above, it is desirable to provide an image forming apparatus capable of preventing abnormal termination of an active job because of a power outage and to provide a control method thereof.

The present invention provides an image forming apparatus, including: an obtaining unit obtaining a start time of power outage; an input unit receiving an input of job executing conditions; a calculating unit calculating, if execution of a job is instructed, a job completion time necessary for completing the job, using the job executing conditions; a determining unit calculating an end time of the job of which execution has been instructed, using the job completion time, and determining whether or not the end time of the job is before the start time of power outage; a specifying unit specifying, if it is determined by the determining unit that the end time of the job is not before the start time of power outage, a part of processing of the job that can be completed before the start time of power outage; and an executing unit executing the job; wherein the executing unit starts the job if it is determined by the determining unit that the end time of the job is before the start time of power outage, and starts the part of processing of the job specified by the specifying unit if it is determined by the determining unit that the end time of the job is not before the start time of power outage.

Preferably, the image forming apparatus further includes a mode transition unit for switching operational mode of the image forming apparatus to an energy saving mode in accordance with a schedule; wherein after the part of processing of the job specified by the specifying unit ends, the mode transition unit switches the image forming apparatus to the energy saving mode.

More preferably, the job is a job including a page-by-page printing process; and the specifying unit specifies, if it is determined by the determining unit that the end time of the job is not before the start time of power outage, a printing process of a number of pages printable before the start time of power outage, as the part of processing of the job that can be completed before the start time of power outage.

More preferably, the job is a job including a print process of a plurality of copies; and the specifying unit specifies, if it is determined by the determining unit that the end time of the job is not before the start time of power outage, a printing process of a number of copies printable before the start time of power outage, as the part of processing of the job that can be completed before the start time of power outage.

The present invention provides a method of controlling an image forming apparatus, including the steps of obtaining a start time of power outage; receiving an input of job executing conditions; calculating, if execution of a job is instructed, a job completion time necessary for completing the job, using the job executing conditions; calculating an end time of the job of which execution has been instructed, using the job completion time, and determining whether or not the end time of the job is before the start time of power outage; specifying, if it is determined at the determining step that the end time of the job is not before the start time of power outage, a part of processing of the job that can be completed before the start time of power outage; and executing the job; wherein at the step of executing the job, the job is started if it is determined at the determining step that the end time of the job is before the start time of power outage, and the part of processing of the job specified at the specifying step is started if it is determined at the determining step that the end time of the job is not before the start time of power outage.

According to the present invention, if execution of a job is instructed to the image forming apparatus in a situation where a power outage is planned and the job cannot be completed before the start of outage, the job is not executed, or only a process or processes included in the job that can be completed before the start of power outage are executed. Therefore, abnormal termination of the active job due to the power outage can be prevented. Thus, problems caused by the power outage during printing, such as a document or recording paper left inside the image forming apparatus, or failure of data reception during a FAX reception, can be prevented.

Further, in a situation where a power outage is planned, a job that cannot be stopped if once started, such as facsimile reception or reserved transmission of image data, is not accepted. Therefore, abnormal termination of an active job due to the power outage can more reliably be prevented.

Further, in a situation where a power outage is planned, a time consuming job involving manual operation such as copying without using an automatic document feeder is not accepted. Therefore, abnormal termination of an active job due to the power outage can more reliably be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a table representing state of operation of the image forming apparatus in accordance with an embodiment of the present invention.

FIG. 5 is a table representing energy saving mode corresponding to the state of operation shown in FIG. 4.

DESCRIPTION OF THE PREFERRED EMBODIMENTS

Figure 1:
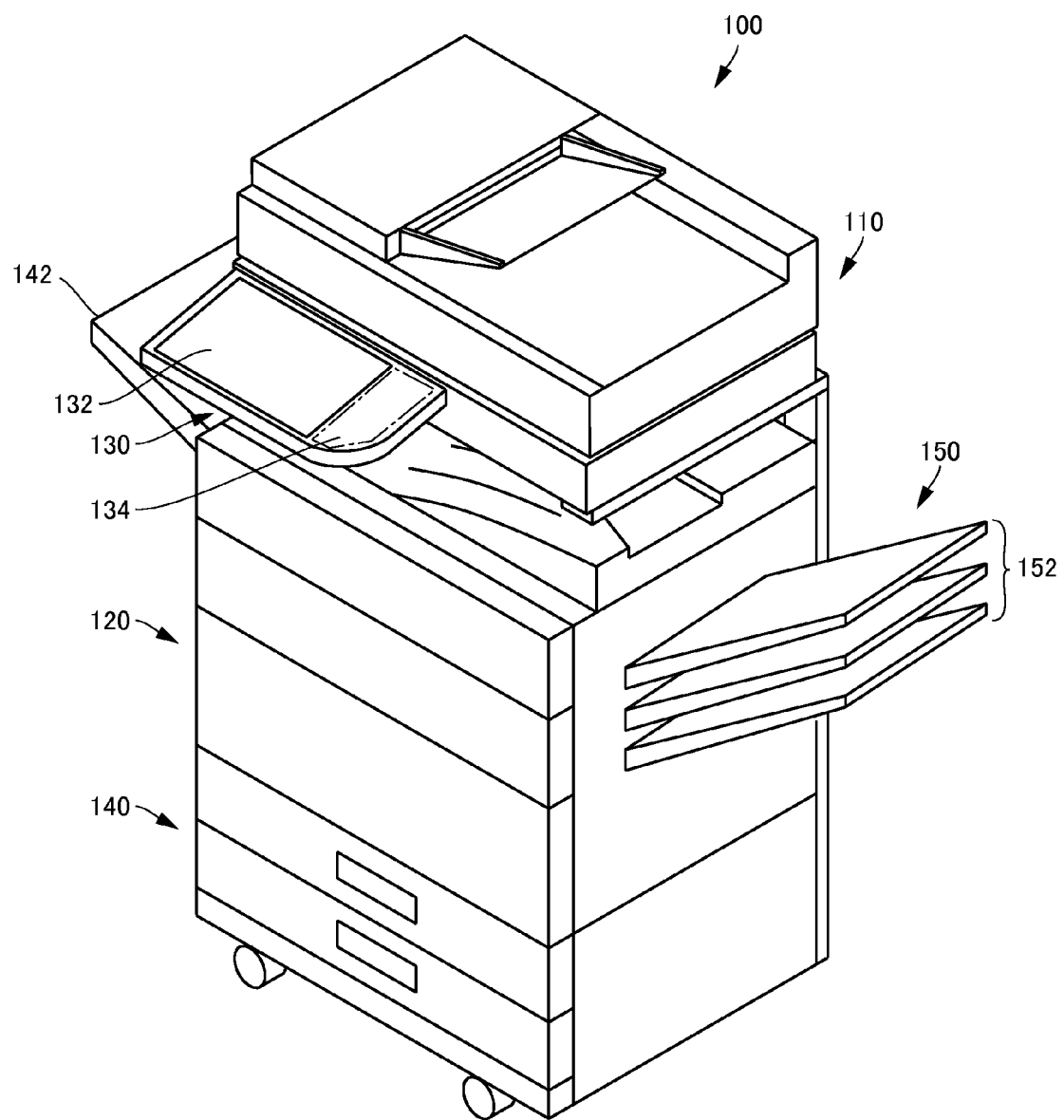
FIG. 1 is a perspective view showing an appearance of the image forming apparatus in accordance with an embodiment of the present invention.

In the following embodiment, the same components are denoted by the same reference characters. Their names and functions are also the same. Therefore, detailed description thereof will not be repeated.

The image forming apparatus in accordance with an embodiment of the present invention is a digital multifunctional peripheral having a plurality of functions including copy function, printer function, scanner function and facsimile function. The image forming apparatus has a function of changing state of electric power conduction therein in accordance with a schedule set in advance in accordance with state of operation of the image forming apparatus itself, so as to enable energy saving state with smaller power consumption.

Referring to FIG. 1, image forming apparatus 100 in accordance with the present embodiment includes a document reading unit 110, an image forming unit 120, an operation unit 130, a paper feed unit 140, a manual paper feed tray 142, and a paper discharge unit 150. Operation unit 130 includes a touch-panel display 132 and an operation key unit 134. Touch-panel display 132 includes a display panel implemented by a liquid crystal panel or the like, and a touch-panel arranged on the display panel and detecting a touched position. On operation key unit 134, a number of function keys, not shown, are arranged.

Figure 2:
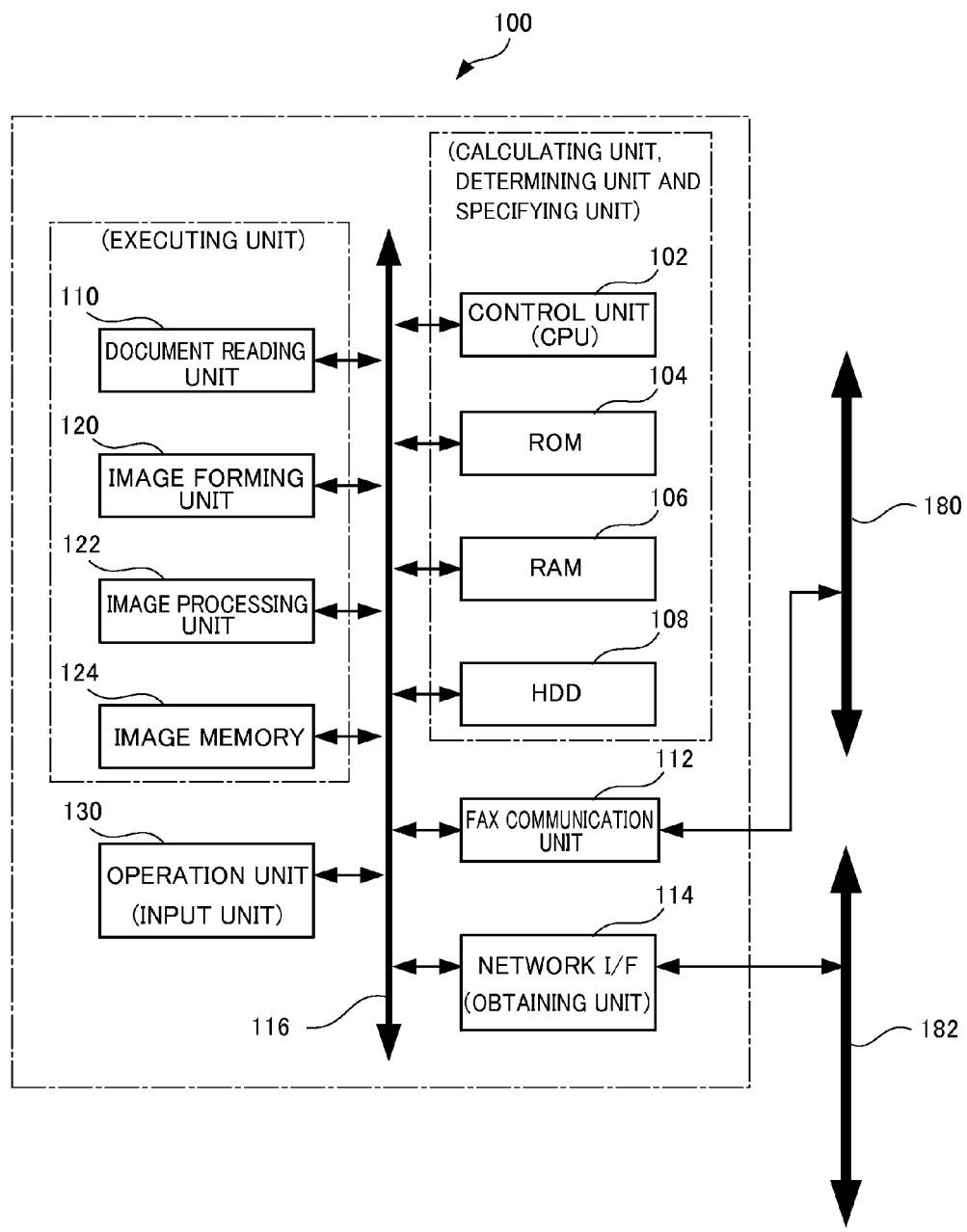
FIG. 2 is a block diagram showing an internal configuration of the image forming apparatus shown in FIG. 1.

Referring to FIG. 2, image forming apparatus 100 includes: a control unit (hereinafter referred to as a CPU (Central Processing Unit)) 102 for overall control of image forming apparatus 100; an ROM (Read Only Memory) 104; an RAM (Random Access Memory) 106; and an HDD (Hard Disk Drive) 108. ROM 104 is a non-volatile storage device that retains data even when power is turned off. ROM 104 stores programs and data necessary for controlling operations of image forming apparatus 100. RAM 106 is a volatile storage device. HDD 108 is a non-volatile storage device.

Image forming apparatus 100 further includes an image processing unit 122, an image memory 124, a FAX communication unit 112, a network I/F 114 and a bus 116. CPU 102, ROM 104, RAM 106, HDD 108, FAX communication unit 112, network I/F 114, document reading unit 110, image forming unit 120, image processing unit 122, image memory 124 and operation unit 130 are connected to bus 116. Data (including control information) are exchanged between each of these components and units through bus 116. CPU 102 reads a program from ROM 104 through bus 116 to RAM 106 and executes the program using a part of RAM 106 as a work area. Specifically, CPU 102 controls various components and units forming image forming apparatus 100 and realizes each of the functions of image forming apparatus 100 in accordance with a program or programs stored in ROM 104.

FAX communication unit 112 is connected to an external public telephone line 180, and it includes a FAX modem as an interface realizing FAX communication between image forming apparatus 100 and an external device through public telephone line 180.

Network I/F 114 is connected to an external network 182, and includes, for example, an NIC (Network Interface Card) as an interface for realizing communication between image forming apparatus 100 and an external device through network 182.

Document reading unit 110 includes a CCD (Charge Coupled Device) for reading an image, and a document detection sensor for detecting a document set on a platen or on an automatic document feeder (ADF). Document reading unit 110 reads the document and inputs image data. The image data is temporarily stored in the image memory (not shown). Image processing unit 122 executes various image processing operations on the read image data. Image forming unit 120 prints image data on a sheet of recording paper. Image data is stored in HDD 108 as needed.

Paper feed unit 140 holds sheets of recording paper for forming images. Manual paper feed tray 142 is a tray for manually feeding sheets of recording paper.

Operation unit 130 receives inputs such as an instruction by the user to image forming apparatus 100. An image displayed on touch-panel display 132 is produced by a screen image producing unit (not shown). The user confirms the state and job processing status of image forming apparatus 100, by the screen images displayed on touch-panel display 132. The user can set functions and instruct operations of image forming apparatus 100 by selecting keys displayed on touch-panel display 132 on the touch-panel superposed on the display panel (by touching the corresponding portions on the touch-panel).

CPU 102 monitors the user operation on touch-panel display 132, input keys and the like provided on operation unit 130, and displays pieces of information to be notified to the user, such as the information on the state of image forming apparatus 100, on touch-panel display 132.

In the following, each of the modes for executing the functions available on image forming apparatus 100 (printer function, copy function, scanner function and facsimile function) will be briefly described.

(Copy Mode)

When image forming apparatus 100 is used as a copy machine, image data of the document read by document reading unit 110 is output as a copy from image forming unit 120.

By the CCD provided at document reading unit 110, images of the document set at a reading position can be electronically read. The read image data is completed as output data (print data) on image memory 124, and stored in HDD 108. If there is a plurality of documents, the reading and storage operations are repeated. Thereafter, based on the process mode instructed from operation unit 130, the image data stored in HDD 108 is successively read at appropriate timing and transmitted to image memory 124. Then, the image data is transmitted to image forming unit 120 timed with image formation at image forming unit 120.

When the read image is to be printed on a plurality of pages, the image data is stored page by page as output data in the similar manner in HDD 108, transmitted from HDD 108 to image memory 124, and transmitted to image forming unit 120 timed with image formation, repeatedly for the number of pages to be output.

At paper feed unit 140, a sheet of recording paper is drawn by a pick-up roller and conveyed by a plurality of conveyer rollers to image forming unit 120. At image forming unit 120, a charged photoreceptor drum is exposed in accordance with the input image data, whereby an electrostatic latent image corresponding to the image data is formed on a surface of photoreceptor drum. Toner is applied to the electrostatic latent image portions on the photoreceptor drum and, thereafter, the toner image is transferred to a sheet of recording paper. Thereafter, the sheet of recording paper is heated and pressed (whereby the image is fixed on the sheet of paper), and then the sheet is discharged to paper discharge tray 152.

(Printer Mode)

When image forming apparatus 100 is used as a printer, image data received through network I/F 114 is output from image forming unit 120 through image memory 124 and the like.

Network I/F 114 receives image data from a terminal (not shown) such as a computer connected to network 182. The received image data is transmitted page by page as output image data to image memory 124, and stored in HDD 108. Thereafter, the image data is again transmitted from HDD 108 to image memory 124, and transmitted to image forming unit 120 as in the copy mode described above, and image formation takes place.

(Scanner Mode)

When image forming apparatus 100 is used, for example, as a network scanner, image data of the document read at document reading unit 110 is transmitted from network I/F 114 through network 182 to a terminal. Here again, the document is electronically read by the CCD provided at document reading unit 110. The read image data is completed as output data on image memory 124, and stored in HDD 108. Thereafter, the image data is again transmitted from HDD 108 to image memory 124, and after communication with a transmission destination designated through operation unit 130 is established, transmitted from network I/F 114 to the designated transmission destination.

(Facsimile Mode)

Image forming apparatus 100 can transmit/receive FAX to and from an external facsimile device through FAX communication unit 112 and public telephone line 180.

When image forming apparatus 100 is used as a facsimile machine, data received by FAX from a facsimile machine is formed as image data on image memory 124, and in the similar manner as described above, storage in HDD 108 and printing by image forming unit 120 can be executed. Further, image forming apparatus 100 can read image data from HDD 108, convert the data to a data format for FAX communication and transmit the converted data to an external facsimile machine through FAX communication unit 112 and public telephone line 180.

In the following, with reference to FIG. 3, a control structure of a program executed by CPU 102 of image forming apparatus 100 when image forming apparatus 100 receives an instruction to execute a job in a situation where a power outage is planned, will be specifically described.

It is assumed that a schedule for controlling power consumption of image forming apparatus 100 and power outage information (such as start time and end time of power outage) are input by an administrator and stored in advance, in HDD 108.

In the present specification, the "time" related to a non-periodic event (for example, the time related to a power outage) includes year, month and day. On the other hand, a periodic "time" (such as a time in the schedule) includes a piece of information dividing one period (such as a day of the week), while it does not always include the year, month and day. If the year, month or day corresponds to the piece of information dividing one period (for example, the "day" in a period of one month), the year, month or day is included in the periodic "time." Therefore, if a specific time is to be compared with the current time and the specific time includes year, month and day, the current time means the time including the year, month and day, and if the specific time does not include the year, month or day, the current time means the time that does not include the year, month or day, either.

When the power of image forming apparatus 100 is turned on, at step 300, CPU 102 reads the schedule stored in HDD 108, and determines a type of energy saving mode corresponding to the current time. The determined type of energy saving mod is stored as energy saving mode specifying information in a prescribed area of RAM 106. The schedule is provided as data for a prescribed time period (for example, one week) divided into a plurality of small periods (of, for example, a unit of one hour), representing energy saving mode of image forming apparatus 100 in each small period.

FIG. 4 shows results of operation status of image forming apparatus 100. FIG. 4 shows the number of sheets of recording paper printed in each period by image forming apparatus 100. In the table, the lateral direction represents day of the week, and the longitudinal direction represents each of a plurality of periods of a day. The periods shown represent one week from Sunday, 0:00 am, sectioned hour by hour. Each cell is specified by the day of the week and the period. Numerical value in each cell represents the number of sheets printed.

The schedule corresponding to FIG. 4 is stored as data representing such a table as shown in FIG. 5, for example, in HDD 108. In FIG. 5, the energy saving mode is classified into four types in accordance with the number of printed sheets, and patterns corresponding to the energy saving modes are drawn on respective cells. By way of example, a state in which image forming apparatus 100 is used most frequently is referred to as "high performance." A state in which image forming apparatus 100 is used at a considerably high frequency, though not as high as in the "high performance" state, is referred to as "performance." The state in which the frequency of use of image forming apparatus 100 is lower than in the "performance" state is referred to as "balance." The state in which the frequency of use of image forming apparatus 100 is the lowest is referred to as "power save." In FIG. 5, the "power save," "balance," "performance" and "high performance" states are shown as corresponding to the number of printed sheets in each cell of 0 to smaller than 10, 10 to smaller than 30, 30 to smaller than 50, and 50 or larger. These states are represented by dot pattern, left-to-right downward hatching pattern, left-to-right upward hatching pattern and cross hatching pattern, respectively. In this manner, the schedule is given as a collection of data (set) related to all combination of day of the week and period, each set including "piece of information specifying day of the week," "piece of information specifying a period in a day" and "piece of information specifying type of energy saving mode." The "piece of information specifying day of the week," "piece of information specifying a period in a day" and "piece of information specifying type of energy saving mode" are, for example, data including numerical value data or characters (including numerals and symbols).

At step 302, CPU 102 determines whether or not an instruction to execute a job has been received. The job is one related to the copy function, printer function, scanner function or facsimile function. If it is determined that an instruction to execute a job has been received, the control proceeds to step 310. Otherwise, the control proceeds to step 304.

Regarding a job for the copy function and scanner function, if the user operates operation unit 130 to set conditions for executing the job and presses a start key (a key instructing start of job execution), CPU 102 determines that the instruction to execute the job is received. Regarding the printer function, if reception of print data transmitted from a terminal through network 182 is completed, CPU 102 determines that the instruction to execute the job is received. Regarding the facsimile function, if execution is instructed by direct operation of operation unit 130, the determination is made in the similar manner as for the copy function and the scanner function. On the other hand, if facsimile transmission is instructed from a terminal through network 182, the determination is made in the similar manner as for the printer function. Regarding facsimile reception, if a call signal is received through public telephone line 180, CPU 102 determines that the instruction to execute a job is received.

At step 304, CPU 102 determines whether or not image forming apparatus 100 is to be stopped, as the start time of power outage is drawing near. Specifically, if power outage information is stored in HDD 108, CPU 102 reads the power outage information, obtains the current time from a timer (a hardware timer or a software timer), and determines whether or not the time until the read outage start time is within a prescribed time period. If it is determined to be in the prescribed time period, CPU 102 stops image forming apparatus 100. Otherwise, the control proceeds to step 306. The prescribed time period can be set appropriately in consideration of the environment of use of image forming apparatus 100 and, by way of example, it is 10 minutes.

At step 306, CPU 102 determines whether or not the current energy saving mode is to be changed. Specifically, CPU 102 refers to the schedule, determines a piece of energy saving mode specifying information specifying the energy saving mode corresponding to the current time obtained at step 304, and determines whether or not it is the same as the piece of energy saving mode specifying information stored in RAM 106. If it is determined to be the same, the control returns to step 302. If it is determined to be different, the control proceeds to step 308, at which CPU 102 changes the energy saving mode, and overwrites the piece of energy saving mode specifying information stored in RAM 106 with the piece of energy saving mode specifying information determined at step 306.

In this manner, unless execution of a job is instructed, steps 302 to 308 are repeated and the energy saving mode is changed in accordance with the schedule. If a power outage is approaching, power source of image forming apparatus 100 is turned off. After the end of power outage, image forming apparatus 100 may be powered on by the user, or the power may be automatically turned on by using a timer. By way of example, a control circuit for turning on the power source and the timer may be operated by a battery, and when the power outage ends and supply of electric power resumes, the power source may be automatically turned on to activate image forming apparatus 100.

If execution of a job is instructed, at step 310, CPU 102 determines whether or not a power outage is planned. Specifically, CPU 102 determines whether or not an effective piece of power outage information is stored in HDD 108. If it is determined that an effective piece of power outage information is stored, the control proceeds to step 314. Otherwise, that is, if no power outage information is stored in HDD 108, the control proceeds to step 312. Even when a piece of power outage information is stored, if the piece of information represents past information before the current time and is not effective, the control proceeds to step 312. If the piece of power outage information is adapted to be deleted from HDD 108 when image forming apparatus 100 is restarted after the end of power outage, it follows that any piece of power outage information stored in HDD 108 is always an effective piece of power outage information. In that case, what is necessary for CPU 102 is simply to determine whether or not any piece of power outage information is stored in HDD 108. It is also possible that two or more pieces of power outage information are stored in HDD 108. In that case, the following process is executed using that piece of power outage information which is closest to the current time.

At step 312, CPU 102 executes the instructed job. Specifically, if there is no power outage expected, the job is executed as usual. Here, it is assumed that a piece of power outage information has been stored in HDD 108 in advance and, therefore, the process of step 314 is executed.

At step 314, CPU 102 determines whether or not the job of which execution is instructed at step 302 is a job of a prescribed type. The prescribed type of job includes, for example, a job of reserved transmission designating FAX reception time or FAX transmission time. If the job is determined to be such a type of job, the control proceeds to step 316. Otherwise, the control proceeds to step 318.

At step 316, CPU 102 displays a prescribed message, cancels the job instructed at step 302 without execution, and the control returns to step 302. By way of example, a message such as "POWER OUTAGE IS PLANNED. INSTRUCTED JOB CANNOT BE ACCEPTED" is displayed. If the job of reserved transmission has been registered by the user by operating operation unit 130, the message is displayed on operation unit 130. If the job of reserved transmission has been instructed from a terminal through network 182, message data is transmitted to the terminal, and the message is displayed on a display unit of the terminal.

In FAX communication, once the telephone line is connected to the counterpart (for example, a FAX machine) and communication starts, the process cannot be suspended halfway and, therefore, it is preferred not to accept the job if a power outage is planned. Therefore, as regards the job for FAX reception, for instance, even when a call signal is received through public telephone line 180, no response is returned (line is not connected), or a busy signal indicating that the line is busy is returned. A function of reserving image transmission designating the timing for executing transmission (time-specified transmission function) has been known. It is preferred not to accept such a reserved transmission also, in order to avoid setting of a time point during the power outage as the transmission time. Since memory transmission is a job for transmission in a spare time, it may be accepted.

If it is a job acceptable even when a power outage is expected, at step 318, CPU 102 determines whether or not the job of which execution is instructed at step 302 is a job for which necessary time of completion (hereinafter referred to as job completion time) is calculable. Specifically, CPU 102 determines whether the instruction to execute at step 302 is a print instruction from an external device such as a terminal, or a copy instruction with the document set on ADF. If it is determined to be a job of which job completion time is calculable, the control proceeds to step 322. Otherwise, the control proceeds to step 320.

At step 320, CPU 102 displays a prescribed message, cancels the job instructed at step 302 without execution, and the control returns to step 302. By way of example, a message such as "POWER OUTAGE IS PLANNED. INSTRUCTED JOB CANNOT BE COMPLETED BEFORE POWER OUTAGE" is displayed. If execution of the job has been instructed by the user by operating operation unit 130, the message is displayed on operation unit 130. If the job has been instructed from a terminal, the message is displayed on the terminal.

At step 322, CPU 102 calculates the job completion time of the instructed job. If image forming apparatus 100 receives image data from a terminal and print execution is instructed, CPU 102 analyzes the received image data, and from the job execution conditions (such as number of pages to be printed, paper size, color or black-and-white print, print density, print quality and two-sided or one-sided print) and performance of image forming apparatus 100 per unit time, calculates the job completion time. As the method of calculating the job completion time, a known method disclosed, for example, in Japanese Patent Laying-Open No. 2003-296084 or 2005-324471 may be used.

If copy execution is instructed with the document placed on ADF, the whole document set on the ADF is scanned and stored in HDD 108. From the data stored in HDD 108 and copy execution conditions, the job completion time can be calculated, as in the printer mode. The job completion time is a sum of printing time and the time for post processing after printing (for punching, stapling or the like). Whether or not the document is placed on the ADF can be detected by, for example, a document detection sensor mounted on the ADF.

If copying is to be done with the document placed on a platen manually by the user, job completion time of the copy instruction cannot be calculated. Therefore, if execution of a job of which job completion time cannot be calculated is instructed, a prescribed message is displayed on operation unit 130, the job instructed at step 302 is not executed, and the control returns to step 302 (step 320).

At step 324, CPU 102 determines, based on the time necessary for completing the job calculated at step 322, whether or not the instructed job can be completed before the outage start time. Specifically, CPU 102 obtains the current time from the timer, and adds the time necessary for completing the job calculated at step 322 to the current time. If the resulting time is a prescribed time period before the outage start time, CPU 102 determines that the job can be completed before the outage start time. If it is determined that the job can be completed before the outage start time, the control proceeds to step 326. Otherwise, the control proceeds to step 328. The prescribed time period may be appropriately set.

At step 324, CPU 102 executes the job as usual. Thereafter, the control returns to step 302.

At step 328, CPU 102 determines whether or not a part of the job can be executed before the outage start time. By way of example, CPU 102 calculates the number of pages printable before the outage start time, of all the pages to be printed. Specifically, CPU 102 divides the time period from the current time to the outage start time by the time necessary for printing one page (as determined in accordance with the job execution conditions), and thereby calculates the number of printable pages. It is preferred that the number of pages to be actually printed is set to be smaller than the calculated number, so as not to go over the outage start time. If it is determined that a part of the job can be executed before the outage start time, the control proceeds to step 330. Otherwise, the control proceeds to step 332.

At step 330, CPU 102 executes a part of the job (prints only the number of pages calculated at step 328). When execution of the part of the job is completed, CPU 102 displays a message that the job is suspended for a while, on operation unit 130. Thereafter, the control returns to step 302. By way of example, a message such as "PRINTING IS SUSPENDED SINCE POWER OUTAGE IS PLANNED. PRINTING RESUMES AFTER THE POWER OUTAGE ENDS" is displayed. If execution of the job has been instructed by the user by using operation unit 130, the message is displayed on operation unit 130. If the job has been instructed from a terminal, the message is displayed on the terminal. The remaining process of the suspended job is stored, for example, in HDD 108 and executed after the outage ends and image forming apparatus 100 is restarted.

At step 332, CPU 102 displays a prescribed message, and the control returns to step 302 without executing the job instructed at step 302. By way of example, a message such as "POWER OUTAGE IS PLANNED. INSTRUCTED JOB WILL BE EXECUTED AFTER THE POWER OUTAGE ENDS" is displayed. Here, different from steps 316 and 320, the job is not cancelled but executed after the outage ends and image forming apparatus 100 is restarted. If execution of the job has been instructed by the user by using operation unit 130, the message is displayed on operation unit 130. If the job has been instructed from a terminal, the message is displayed on the terminal.

As described above, if execution of a job is instructed to image forming apparatus 100 in a situation where a power outage is planned, the job completion time is estimated and if it is before the outage start time, the job can be executed. If the estimated job completion time is on or after the outage start time, only a part of the job process is executed before the power outage, and the remaining process can be executed after the end of power outage. Further, if execution of a prescribed job (such as FAX reception, transmission reservation, or copying without using ADF) is instructed in a situation where a power outage is planned, the job is not accepted. As the processing is changed in accordance with the type of the job, it becomes possible to prevent forced termination of the process in the middle of the job due to the power outage. Thus, problems caused by the power outage during printing, such as a document or recording paper left inside image forming apparatus 100, or failure of data reception during a FAX reception, can be prevented.

In the foregoing, an example has been described in which the energy saving mode schedule and the power outage information are stored in HDD 108 in advance by an administrator. The example, however, is not limiting. By way of example, image forming apparatus 100 may have a learning function, and the energy saving mode schedule may be changed in accordance with the result of learning.

The power outage information may be transmitted from a terminal through network I/F 114, and image forming apparatus 100 may store the received power outage information in HDD 108. If image forming apparatus 100 has the learning function, the time when power was turned off in the past because of an external factor may be stored, and by learning based thereon, the power outage information may be determined.

The power outage information has only to include at least a piece of information that can specify the start time (including year, month or day) of power outage. For example, only the start time of power outage, both the start time and end time of power outage, or the end time and duration of power outage may be included.

Figure 3:
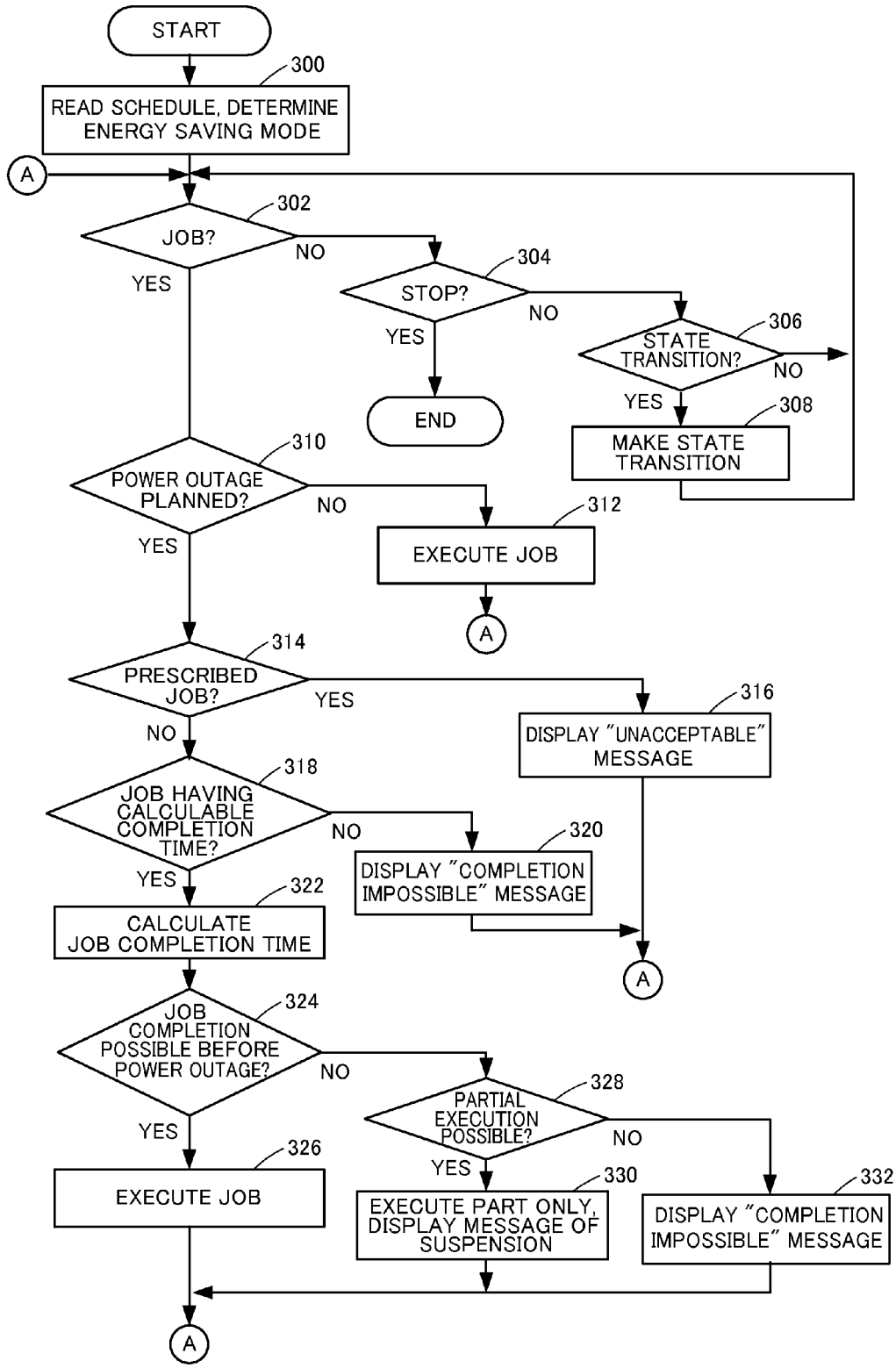
FIG. 3 is a flowchart representing a control structure of a program controlling execution of a job in consideration of a planned power outage, of the image forming apparatus in accordance with an embodiment of the present invention.

The flowchart of FIG. 3 may appropriately be modified. At step 306, whether a transition is to be made or not is determined based simply on the schedule and the current time. The control, however, is not limited to the above. For instance, a transition may be made in consideration of time after the completion of a job. If the transition to the energy saving mode is to be made, for example, the heating and fixing unit of image forming unit 120 is set to a preheat mode. In that case, a time period from the end of a job when operation of the heating and fixing unit stops to the entrance to the preheat mode (transition time) may be set in accordance with the type of energy saving mode, and at step 306, whether the transition is to be made or not may be determined by determining whether or not the transition time corresponding to the type of energy saving mode has passed. The transition time is set because it is not preferable to cut power conduction to the heating and fixing unit in a very short time period after the end of a job in image forming apparatus 100, since image formation cannot be started immediately after power supply to the heating and fixing unit is started for forming an image.

The message displayed at steps 316 and 320 may include the power outage information (outage start time) read at step 310. By way of example, a message such as "POWER OUTAGE PLANNED AT : TODAY. INSTRUCTED JOB CANNOT BE ACCEPTED" may be displayed.

An example has been described in which the job is uniformly unaccepted if it is an object of inhibition at step 314. The example, however, is not limiting. The user may be asked to select whether to execute or cancel the job, when the message is displayed. A job as the object of inhibition may possibly be completed before the outage start time. In such a case, the job may be executed if the user instructs execution.

At step 318, the copy instruction with the document set on the ADF has been regarded as a job of which completion time can be calculated. The job, however, may be treated as a job of which job completion time cannot be calculated.

An example has been described in which post processing (such as punching or stapling) after printing is included in the job completion time at step 322. The job involving post processing of printing takes time and, therefore, it may not be accepted at step 318.

An example has been described in which if copy execution is instructed with the document set on the ADF, the entire document set on the ADF is scanned and stored in HDD 108 at step 322. The example, however, is not limiting. For instance, instead of actually reading the document using the ADF, information necessary for calculating the job completion time such as the number of pages of the document may be input by the user through operation unit 130. The information to be input is such information that cannot be obtained unless the document is scanned. The document size can be detected by a sensor, and the number of copies to be printed, resolution of scanning and whether color or black-and-white printing is to be done are set as execution conditions of the job and, therefore, input of these pieces of information by the user is unnecessary. The input information may not be very accurate. The job completion time can be calculated if the information has some degree of accuracy.

An example has been described in which the number of pages printable before the outage start time is calculated at step 328. The example, however, is not limiting. For instance, if printing of a plurality of copies is instructed, the number of copies printable before the outage start time is calculated.

An example has been described in which only a part of job processing is executed at step 330 and thereafter the control returns to step 302. Since the outage start time is coming close when the process of step 330 is executed, however, image forming apparatus 100 may make a transition to the "power save" state to be ready for the power outage. Further, image forming apparatus 100 may not accept any job.

An example has been described in which it is determined at step 302 that an instruction to execute a job is received when reception of print data transmitted from a terminal through network 182 is completed, if the job is for the printing function. The example, however, is not limiting. For instance, it may be determined that the instruction to execute a job is received when reception of print data transmitted from a terminal through network 182 is started. When image forming apparatus 100 executes the print function, typically, the following processes are executed in parallel. Specifically, the process of receiving print data, the process of producing image data for printing page by page from the received data, the process of compressing and storing in HDD 108 the page-by-page image data for printing, the process of reading and decompressing the page-by-page compressed data from HDD 108 to produce image data for printing, and the process of printing the decompressed image data for printing. In such a situation, after image forming apparatus 100 has received the data to some extent, it is possible at step 322 to calculate the job completion time. More specifically, if the data has been received to some extent and the image data for printing has been produced to some extent from the received data, the job completion time can be calculated. Therefore, if a print job is instructed from a terminal and it is determined at step 324 that the job cannot be completed before the outage start time (if it is determined to be impossible to print designated number of copies of all pages), at step 330, at the stage where all data are received and stored in HDD 108, CPU 102 may suspend execution of the job without executing printing. Alternatively, at the stage where all data are received, and all image data for printing are produced, compressed and stored in HDD 108, CPU 102 may suspend execution of the job. Depending on the received data, production of image data for printing takes long time. By way of example, if a large number of objects are included in a complicated arrangement in the received data, it takes very long to execute rendering and to produce image data of one page. In such a case, it is preferred to suspend the job at the stage where all the data are received and stored in HDD 108, before producing the image data for printing.

Some image forming apparatuses have a function of limiting the number of pages to be printed for each logged-in user. Specifically, a limit value (for example, the maximum number of pages one can print per one month) can be set for each user account. In that case, the limit value may be used for determining whether or not the job can be completed before the outage start time. By way of example, at step 322, if it is determined that the job cannot be completed before the outage start time from the result of calculation and the number of printing for the user account is close to the limit value, it is possible that the limit value is reached before the outage start time and job execution is inhibited. Therefore, CPU 102 may execute the process of step 326, determining that the job can be completed. In that case, if the number of printing reaches the limit value, a separate program managing the limit value stops the job.

The application of the present invention is not limited to the situation in which the operational mode of image forming apparatus 100 is controlled in accordance with the schedule. Image forming apparatus 100 may not have the scheduling function. The present invention may be applicable to any image forming apparatus capable of storing at least the power outage information and obtaining the current time.

Though an example in which image forming apparatus 100 executes all instructed jobs has been described above, it is not limiting. If the job cannot be completed by the outage start time, for example, image forming apparatus 100 may transfer the job to another image forming apparatus capable of operating at higher speed to execute the job. Alternatively, image forming apparatus 100 may execute a part of the job and remaining part of the job may be transferred to another image forming apparatus and be executed in parallel. Such a manner of processing may be selected by the user.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus, comprising:
   an obtaining unit obtaining a start time of planned power outage;
   an input unit receiving an input of job executing conditions;
   a calculating unit calculating, if execution of a job is instructed, a job completion time necessary for completing the job, using the job executing conditions;
   a determining unit calculating an end time of said job of which execution has been instructed, using said job completion time, and determining whether or not the end time of said job is before said start time of planned power outage;
   a specifying unit specifying, if it is determined by said determining unit that the end time of said job is not before said start time of planned power outage, a part of processing of said job that can be completed before said start time of planned power outage; and
   an executing unit executing said job; wherein
   said executing unit
   starts said job if it is determined by said determining unit that the end time of said job is before said start time of planned power outage, and
   starts said part of processing of said job specified by said specifying unit if it is determined by said determining unit that the end time of said job is not before said start time of planned power outage.

2. The image forming apparatus according to claim 1, further comprising:
   a mode transition unit for switching operational mode of said image forming apparatus to an energy saving mode in accordance with a schedule; wherein
   after said part of processing of said job specified by said specifying unit ends, said mode transition unit switches said image forming apparatus to said energy saving mode.

3. The image forming apparatus according to claim 1, wherein
   said job is a job including a page-by-page printing process; and
   said specifying unit specifies, if it is determined by said determining unit that the end time of said job is not before said start time of planned power outage, a printing process of a number of pages printable before said start time of planned power outage, as said part of processing of said job that can be completed before said start time of planned power outage.

4. The image forming apparatus according to claim 1, wherein
   said job is a job including a print process of a plurality of copies; and
   said specifying unit specifies, if it is determined by said determining unit that the end time of said job is not before said start time of planned power outage, a printing process of a number of copies printable before said start time of planned power outage, as said part of processing of said job that can be completed before said start time of planned power outage.

5. A method of controlling an image forming apparatus, comprising the steps of:
   obtaining a start time of planned power outage;
   receiving an input of job executing conditions;
   calculating, if execution of a job is instructed, a job completion time necessary for completing the job, using the job executing conditions;
   calculating an end time of said job of which execution has been instructed, using said job completion time, and determining whether or not the end time of said job is before said start time of planned power outage;
   specifying, if it is determined at said determining step that the end time of said job is not before said start time of planned power outage, a part of processing of said job that can be completed before said start time of planned power outage; and
   executing said job; wherein
   at said step of executing said job
   said job is started if it is determined at said determining step that the end time of said job is before said start time of planned power outage, and
   said part of processing of said job specified at said specifying step is started if it is determined at said determining step that the end time of said job is not before said Fstart time of planned power outage.

* * * * *